May 20, 1969     F. R. QUINN     3,445,086
SNAP ACTING VALVE AND CONTROL MECHANISM THEREFOR
Filed Nov. 25, 1966

INVENTOR.
Frederic R. Quinn
BY
ATTORNEY

United States Patent Office 3,445,086
Patented May 20, 1969

3,445,086
SNAP ACTING VALVE AND CONTROL
MECHANISM THEREFOR
Frederic R. Quinn, Red Hook, N.Y., assignor to Zyrotron
Industries, Inc., Red Hook, N.Y.
Filed Nov. 25, 1966, Ser. No. 596,954
Int. Cl. F16k 17/38, 31/00
U.S. Cl. 251—11                                            2 Claims

ABSTRACT OF THE DISCLOSURE

The combination of a valve and a control therefor wherein the valve includes a valve body and a valve member which seats in an orifice in a partition which separates the chambers. An actuating member is connected to and adapted to operate the valve member between valve open and valve closed positions. Connected to the actuating member is a first bracket which is operable to move the valve member by temperature responsive means. The temperature responsive means includes a piston in a cylinder movable to an extended position by heat-expansible element to move the bracket. Heating means including a ceramic resistor is provided to selectively raise the ambient temperature of the expansible element.

---

This invention relates to improvements in snap-acting valves of the type which are moveable quickly between open and closed positions to regulate the flow of a fluid through the valve, and to control mechanisms for rapidly operating the valve between its open and closed positions.

Snap-acting valves of the type under consideration usually comprise a valve body having a fluid inlet chamber and a fluid outlet chamber operated by a partition having a fluid opening therein. The opening is selectively closed by a resilient valve member which normally rests on the fluid opening under the influence of a biasing force produced by a resilient diaphragm. An appropriate valve actuating member is provided for operating the valve member to a valve open position to permit the flow of a fluid through the valve. For example, a valve similar in construction to the valve structure described is illustrated in my U.S. Patent No. 3,107,894, issued on Oct. 22, 1963. Valves of the above-described type have been found extremely useful as an off-off control for fluid flow in sinks, dishwashers, toilets and the like because of the snap-acting operation which accelerates valve action. However, these valves normally remain in a closed state and are moved to the open state by complex mechanical arrangements which are both costly and are subject to defective operation.

Accordingly, an object of the present invention is to provide a snap-acting valve construction in which the valve may selectively reside in either a normally open or a normally closed state without the need for maintaining the valve in one of the states by an external force.

Another object of the present invention is to provide control mechanisms for a valve structure which produces a trigger-type spring action to accelerate valve action.

A further object of the present invention is to provide control mechanisms for a valve structure which is inexpensive to produce.

Another object and feature of the present invention resides in the novel details of construction which provide different control mechanism constructions which are characterized by their simple construction and their positive operation.

In furtherance of the above objects, the valve of the present invention includes a valve member which is adapted to seat on an appropriate valve member seat to prevent communication between a valve inlet and a valve outlet chamber. The valve member is further adapted to be moved to a position in which it is spaced from the seat by an actuating member to open the valve to provide for the flow of a fluid therethrough. In accordance with the present invention, the valve member includes a diaphragm which operates similarly to an over-the-center toggle linkage so that the valve member will remain in either the seated or the unseated position. Hence, the need for an external force to maintain the valve in either the valve open or the valve closed position is eliminated. To put this another way, once the valve is moved to one of its steady-state positions, no further force is necessary to maintain the valve in that position.

Additionally, as noted hereinabove, the present invention further includes the provision of control mechanisms for quickly moving a snap-acting valve from one position or state to the other in response to the occurrence of a predetermined condition.

For example, such mechanism includes a piston chamber having a piston slidably received therein. The piston chamber is fixedly secured to a movable bracket which is connected to the actuating member of the valve structure. The piston bears against a fixed bracket which is secured to the valve body.

Movement of the piston effects concomitant movement of the movable bracket. Accordingly, the actuating member will be operated in response to movement of the piston to open the valve so that the fluid flows from the inlet chamber to the outlet chamber through the fluid opening.

A thermally responsive member is provided in the piston chamber in operative association with the piston. The member is of the type which expands quickly when the ambient temperature reaches a preselected level and which contracts quickly when the ambient temperature falls below the preselected level. The control mechanism of the present invention also includes heating means in heat exchanging relationship with the member. Thus, when it is desired to open the valve structure, the member is heated to quickly expand the same thereby effecting movement of the piston, which, in turn, causes the actuating member to quickly open the valve to obtain accelerated valve action.

A feature of this invention is to provide simple valve control mechanisms which provide a trigger-like spring action to quickly operate the valve.

Other objects and advantages of the present invention will become more apparent from a consideration of the following detailed description when taken in conjunction with the accompanying drawings, in which.

Figure 1:
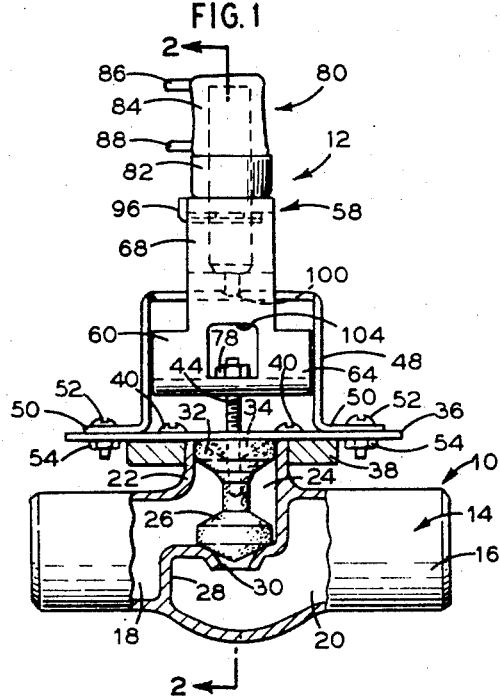
FIG. 1 is a front elevational view, with parts broken away, illustrating a snap-acting valve mounting a valve control mechanism constructed according to the present invention.

Referring to the drawings, there is shown in FIG. 1 a snap-acting valve 10 of the type shown in the aforementioned patent mounting a valve control mechanism, designated generally by the reference numeral 12. The valve 10 comprises a T-shaped valve body 14, the cross-head portion 16 of which defines an inlet fluid chamber 18 and an outlet fluid chamber 20, the respective ends of which are adapted to be connected to suitable conduits (not shown). The stem portion 22 of the valve body 14 is disposed in communication with the inlet fluid chamber portion 18 of the valve body and defines a fluid chamber 24 in which a valve member 26 is reciprocally mounted.

A partition 28 separates the inlet chamber 18 from the outlet chamber 20. Formed in the horizontal wall of the partition 28 is an orifice 30 for connecting the inlet chamber 18 to the outlet chamber 20. The orifice 30 is defined by a frusto-conically shaped wall portion having a convex surface on the inlet side portion thereof and which converges toward the fluid outlet chamber portion 20.

Figure 2:
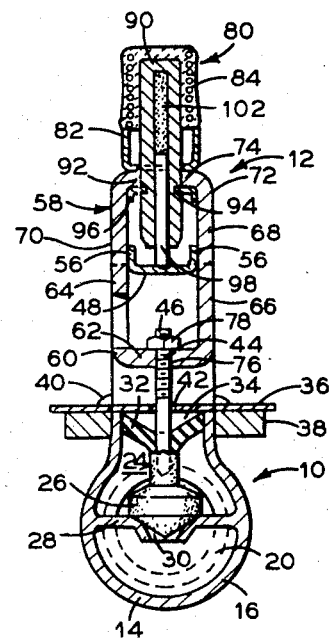
FIG. 2 is a sectional view thereof taken along line 2—2 of FIG. 1.

The valve member 26 is preferably formed of a resilient material, such as rubber, neoprene, or the like. The member 26 comprises a conically shaped plug end portion, a valve stem connected thereto, and a diaphragm or spring disc 32 connected to the upper end of the valve stem. The upper surface of the diaphragm 32 is inclined downwardly radially inwardly to define a sloping depression or recess 34. As shown in FIGS. 1 and 2, the peripheral edge of the upper surface of the diaphragm 32 abuts the lower surface of a plate 36 which mounts the valve control mechanism 12 on the valve 10. The depression 34 is provided to impart a biasing characteristic to the diaphragm so that the plug end of the valve member 26 will always seat on the orifice 30 to close the same and prevent communication between the inlet chamber 18 and the outlet chamber 20 of the valve.

More specifically, when the valve member 26 is moved upwardly relative to the partition 28 to open the orifice 30, the walls defining the depression or recess 34 tend to flatten or become coplanar, by reason of their engagement with the lower surface of the plate 36. When the walls forming the recess 34 are thus deformed, they tend to return to their original position because of the natural resiliency of the member 26. Accordingly, a return biasing force is produced in the valve member 26 which automatically tends to return the valve member 26 to the valve closed position wherein the plug end of the valve member seats on the orifice 30.

For ease of reference, the position in which the valve member 26 seats on the orifice 30 to close the same will be referred to hereinafter as the valve closed position. The position of the valve member 26 in which the valve member is spaced from the orifice 30 to provide for the flow of a fluid from the inlet chamber 18 to the outlet chamber 20 will be referred to as the valve open position of the member.

The valve control mechanism 12 is operable to quickly move the valve member 26 to the valve open position. In other words, the valve control mechanism 12 imparts a snap-action to the valve member to move the valve member to the valve open position and to allow the same to quickly return to the valve closed position. The valve control mechanism, as noted above, is mounted on the supporting plate 36 which, in turn, is affixed to a rectangular plate 38, which surrounds the stem portion 22 of the valve body 14, by screws 40. Centrally located in the supporting plate 36 is an aperture 42 which slidingly receives a stem 44 therethrough. One end of the stem 44 is embedded in the valve member 26 so that upward movement of the stem 44 will cause the valve member to move to the valve open position. The upper end of the stem 44 is threaded at 46 for reasons which will become apparent hereinbelow.

The valve control mechanism 12 includes an inverted U-shaped band 48 having opposed laterally extending legs 50 which are connected to the arms of the U-shaped band and which rests on the supporting plate 36. Screws 52 and nuts 54 maintain the band 48 in place on the supporting plate. As shown in FIG. 2, the bight portion of the U-shaped band 50 is provided with opposed upturned flanges 56 so that the top surface of the bight defines a channel.

An inverted T-shaped operating member, designated generally by the reference numeral 58, is provided to move the stem 44 and to concomittantly move the valve member 26 between the valve open and the valve closed positions. The cross-bar 60 of the T-shaped member 58 comprises a transverse wall 62 and opposed upstanding walls 64 and 66. The leg of the T-shaped member 58 includes opposed walls 70 and 72 which are respectively upstanding from the walls 64 and 66 and which are connected at their uppermost edge by a transverse wall 74. The transverse distance between the opposed walls 64, 66, 70 and 72 is slightly in excess of the width of the bight of the U-shaped member 48 so that the bight of the U-shaped member is received between the aforementioned walls of the operating member 58. As shown in FIG. 2, the upturned flanges 56 of the U-shaped member 48 abut the opposed walls of the operating member 58 in a sliding engagement, so that the operating member 58 may move relative to the U-shaped member.

Provided in the bottom transverse wall 62 of the U-shaped member 48 is an aperture 76 which receives the stem 44 therethrough. A nut 78 is threaded onto the threaded portion 46 of the stem 44 and abuts the transverse wall 62 when the valve member 26 is in the valve closed position.

The upper transverse wall 74 of the operating member 58 mounts an actuating assembly designated generally by the reference numeral 80. More particularly, the actuating assembly 80 includes a metal cup-shaped member 82 which abuts the upper surface of the transverse wall 74 and which supports a ceramic resistor 84. The ceramic resistor 84 is of known construction and is commercially available and includes a pair of terminals respectively designated as 86 and 88 which are adapted to be connected to a source of potential (not shown). When the ceramic resistor 84 is energized, it produces and stores heat within its ceramic coating. Imbedded within the ceramic resistor 84 and extending below the same is a piston cylinder 90 which extends through an aperture 92 in the transverse wall 74.

Defined in the surface of the piston cylinder 90 is a groove 94 which is positioned below the transverse wall 74 of the operating member 58. Received within the groove 94 is a locking member 86 which abuts the lower surface of the transverse wall 74 to secure the acuating assembly 80 in position.

Recieved within the piston cylinder 90 is a piston 98, the lower end of which normally rests in a depression 100 in the bight portion of the U-shaped band 48. Also received within the piston cylinder 90 and abutting the edge of the piston 98 is a temperature responsive element 102. The temperature responsive element 102 is preferably of the type disclosed in Patent No 2,258,846 issued to S. Veret, et al., on Oct. 21, 1941. This material is adapted to rapidly expand or rapidly contract when the ambient temperature respectively rises above or falls below a preselected level.

Figure 4:
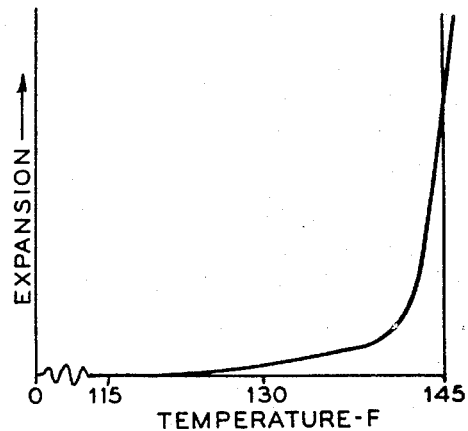
FIG. 4 is a graph illustrating the expansion of the control element in the valve control mechanism of FIG. 1, as a function of temperature.

FIG. 4 is a graph which illustrates the relationship between the expansion of the element 102 and the ambient temperature. As will be evident from a consideration of the graph, the element retains its original length until the ambient temperature reaches approximately 120° F. The element then begins to expand slightly until the ambient temperature reaches approximately 145° F. At this point, the element expands at a rapid rate thereby to rapidly move the piston 98 downwardly out of the piston cylinder 90. When the ambient temperature falls below 145° F. the element 102 quickly contracts thereby forming a vacuum in the piston cylinder which draws the piston 98 back to its retracted position. While the temperatures noted above are preferable for the valve control mechanism 12 of the present invention, they are not to be interpreted as being a limitation on the present invention since the temperatures may be made to vary in accordance with the use of the control mechanism 12.

When the piston 98 is moved to its extended position by the expansion of the temperature responsive element 102, the distance between the bight of the U-shaped member 48 and the upper transverse wall 74 of the operating member 58 increases. To put this another way, when the piston 98 is moved to its extended position it engages the bight of the U-shaped band 48 and moves the upper transverse wall 74 and, therefore, the operating member 58 upwardly relative to the band 48. The upward movement of the band 58 is accompanied by the concomitant upward movement of the stem 44 and the valve member 26. Accordingly, the valve member 26 will be moved to the valve open position thereby allowing fluid to flow through the valve 10.

However, when the ambient temperature of the temperature-responsive element 102 falls below 145° F., the temperature-responsive element 102 quickly contracts to cause the piston 98 to return to its retracted position. This action is accompanied by a downward movement of the operating member 58 and the biasing forces which arise in response to the deformation of the diaphragm 32 will bias the valve member 26 back to the valve closed position.

When the control mechanism 12 is assembled, the stem 44 is received through the aperture 76. The nut 78 is then threaded onto the stem portion 46 until the nut abuts the transverse wall 62 of the operating member 58. A window 104 is provided in the operating member 58 to permit access to the nut 78 and the stem portion 76.

In operation, the valve control mechanism 12 may be utilized to maintain the valve 10 in a normally open or a normally closed position. In the discussion which follows, however, it will be assumed that the valve 10 operates as a normally closed valve. Accordingly, the valve member 26 seats on the orifice 30 thereby to prevent communication between the inlet chamber 18 and the outlet chamber 20. If it is desired to open the valve to allow fluid flow through the valve, a source of potential (not shown) is connected to the terminals 86 and 88. The current flowing through the resistor causes the temperature of the same to rise. Morever, the heat is stored within the ceramic resistor so that the ambient temperature of the temperature-responsive element 102 rises sharply. When the ambient temperature rises to approximately 145° F. the temperature-responsive element 102 expands at an extremely rapid rate thereby to move the operating member 58 upwardly in the above-noted manner.

The upward movement of the operating member 58 causes the stem 44 and, therefore, the plug of the valve member 26 to move upwardly thereby unseating the valve member 26 from the orifice 30. Accordingly, fluid flows from the inlet chamber 18 through the orifice 30 to the outlet chamber 20 thereby providing a continuous path for the flow of the fluid through the valve 10.

It should be noted that the action of the temperature-responsive element 102 is sufficiently rapid so that the plug end of the valve member 26 is quickly unseated from the orifice 30 when the temperature rises to or above 145° F. In other words, a snap-action is imparted to the operation of the valve member 26 which quickly causes the valve member to move to the valve open position.

It should also be noted that the ceramic resistor includes a coil encapsulated with a ceramic material which easily can expand when heated so that it will not crack. The ceramic material is utilized to contain or store the heat and apply the same to the piston cylinder 90 to heat the temperature-responsive element 102.

When it is desired to close the valve 10, the source of potential is removed from the terminals 86 and 88 and the heat applied to the piston cylinder 90 is allowed to dissipate. When the temperature falls below 145° F. the temperature-responsive element 102 quickly contracts thereby to draw the piston 98 into the cylinder 90. Accordingly, the operating member 58 will be lowered relative to the U-shaped band 48 thereby to remove the upward biasing force applied to the stem 44. The forces produced in the diaphragm 32 due to the deformation or stress of the upper surface of the diaphragm causes the valve member to rapidly return to the valve closed position. Accordingly, the valve member 26 also experiences a downward snap-acting force which moves the valve member back to the valve closed position.

If it is desired to operate the valve 10 as a normally open valve, then the source of potential is continuously connected to the terminals 86 and 88 thereby to cause the operating member to maintain the valve member 26 in the valve open position. When it is desired to close the valve, the source is removed from the terminals 86 and 88. When the ceramic resistor 80 cools sufficiently so that the ambient temperature drops below 145° F., the element 102 contracts. Accordingly, the valve member 26 will rest on the orifice 30 to close the valve 10 and prevent fluid flow therethrough.

Accordingly, a snap-acting valve control mechanism has been disclosed which is simple in operation, which is easy to maintain, and which produces a trigger-type spring action to accelerate valve action.

Figure 3:
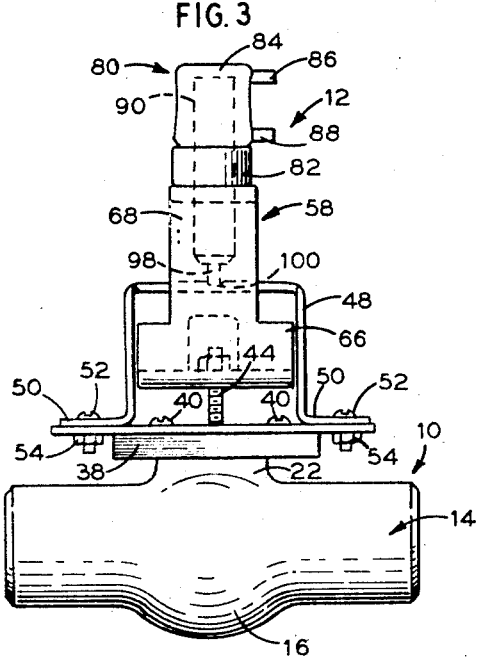
FIG. 3 is a rear elevational view of the valve and valve control mechanism shown in FIG. 1.
Figure 5:
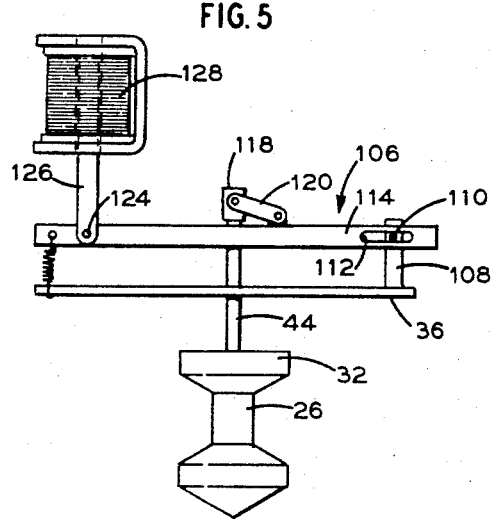
FIG. 5 is a front elevational view of a modified embodiment of a valve control mechanism illustrating its connection to a valve member.

FIG. 5 illustrates a modified embodiment of a snap-acting valve control mechanism which is designated generally by the reference numeral 106. The mechanism 106 includes a solenoid which responds immediately to the flow of a current therethrough to move a valve to the valve open position. It is to be understood that the mechanism 106 is supported on and is adapted to be used in conjunction with a valve similar to the valve 10 shown in FIGS. 1-3. However, portions of the valve 10 have not been shown in detail for purposes of clarity.

Upstanding from one end of the plate 36 is a support post 108 which is provided with a laterally projecting pin 110. The pin 110 is received in an elongated slot 112 in one end of an actuating lever 114. The other end of the lever 114 is connected to the plate 36 by a biasing spring 116 which biases the lever 114 in a counterclockwise direction around the pin 110.

Connected to the top of the stem 44 is a cap 118 having a forwardly projecting arm 120 which is connected to the upper surface of the lever 114.

The core 126 of a solenoid 128 is connected to the lever 114 adjacent the spring 116 by a pivot pin 124. The distance between the pivot pin 124 and the point at which the arm 120 engages the lever 114 is some multiple of the distance between the arm 120 and the pin 110. The ratio is chosen to insure that the stem 44 and, therefore, the valve member 26 will move upwardly a sufficient distance so that the valve member will be moved to the valve open position when the solenoid 128 is operated.

In operation, when it is desired to open the valve, a source of potential (not shown) is connected to the solenoid 128 to energize the same. The core 126 moves upwardly in the solenoid winding thereby causing the lever 114 to shift longitudinally and to rotate in a clockwise direction about the pin 110. Thus, the arm 120 will be pulled upwardly thereby moving the valve to the valve open position by virtue of the connection comprising the cap 120 and the stem 44. Moreover, the operation of the valve will be practically instantaneous, since the core 126 will be drawn upwardly as soon as the potential is applied to the solenoid 128.

When it is desired to close the valve, the circuit between the solenoid 128 and the source of potential is broken thereby deenergizing the solenoid. The spring 116 quickly moves the lever 114 back to its original position thereby permitting the valve member 26 to seat on the orifice 30 to close the valve.

By utilizing the construction shown in FIG. 5, the operation of the valve is instantaneous. In other words, the valve operates as soon as the source of potential is connected to or removed from the solenoid winding. Moreover, the biasing spring assures a quick return of the valve to the valve closed position rather than relying on forces due to gravity or to stresses set up in the valve member to effect such closing.

Figure 7:
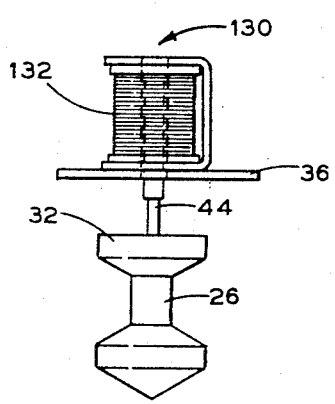
FIG. 7 is a front elevational view of another modified embodiment of a valve control mechanism shown connected to a valve member of the type utilized in the snap-acting valve shown in FIGS. 1–3.

FIG. 7 illustrates a modified embodiment of the hereinabove described control mechanism which substantially eliminates the lever construction. Thus, the control mechanism of FIG. 7 which is designated generally by the reference numeral 130, includes a solenoid winding 132 which is supported on the plate 36 of a valve 10 by a suitable bracket (not shown). The solenoid winding is positioned so that it is coaxial with the stem 44 and the stem 44 is movable through the center of the solenoid. To put this another way, the stem 44 forms the core of the solenoid.

Normally, the valve member will be positioned in the valve closed state. However, when it is desired to operate the valve to the valve open position, the solenoid winding is energized by a source of potential (not shown) to cause the core or stem 44 to move upwardly in the conventional manner. This action causes the valve member to move to the valve open position by unseating the same from the orifice. When it is desired to close the valve, the solenoid winding 132 is deenergized and the valve member 26 returns to its normal valve closed position either due to the biasing forces set up by the deformation of the valve members or by the force due to gravity.

Figure 6:
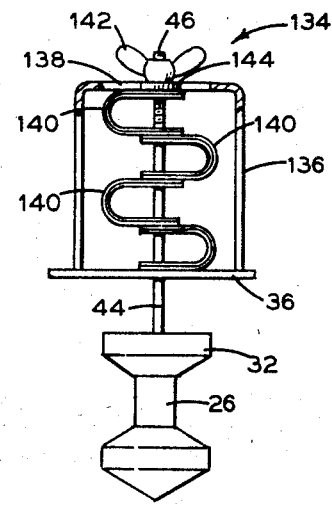
FIG. 6 is a front elevational view of a further modified embodiment of a valve control mechanism showing its relationship with a valve member.

FIG. 6 illustrates a control mechanism for a snapacting valve which is designated generally by the reference numeral 134. The control mechanism 134 is temperature responsive and it is adapted to be used in conjunction with the valve 10 to move a valve member between valve open and valve closed positions. Accordingly, only portions of the valve 10 are shown in FIG. 6 to clarify an explanation of the mechanism.

The mechanism 134 includes an inverted U-shaped bracket 136 which is connected to the plate 36 in any conventional manner. Provided in the bight portion of the bracket 136 is an aperture 138 through which the stem 42 extends. A plurality of U-shaped bimetallic strips 140 are received about the stem 44.

More particularly, each bimetallic strip 140 is provided with aligned apertures in its leg which slidingly receive the stem 44 therethrough. Moreover, each leg of a bimetallic member rests on the adjacent leg of the juxtaposed strip so that each strip 140 is in engagement with the next adjacent strip.

Threadedly received on the threaded portion 46 of the stem 44 is a wing nut 142 having a depending peripheral wall 144. The bottom edge of the wall 144 abuts the uppermost leg of the top U-shaped strip 140 which is spaced below the bight of the bracket 144.

When the ambient temperature begins to rise, the legs of each strip 140 begin to move in opposed directions thereby increasing the distance therebetween. Consequently, the distance between the uppermost leg of the top strip 140 and the lowermost leg of the bottom strip will increase. Hence, an upward force will be applied to the stem 44 through the engagement of the strips 140 with the wing nut 142. When the expansion of the strips 140 reaches a preselected level, the valve member 26 will be unseated from the orifice thereby opening the valve. On the other hand, when the strips 140 cool, the valve member 26 will assume the valve closed position.

It will be appreciated that the control mechanism 134 shown in FIG. 6 provides a means for moving the valve to the valve open position at different selected temperatures. This is accomplished by moving the wing nut 142 axially on the stem 44 to change the distance between the bottom edge of the wall 144 and the plate 136. Thus, if the distance is decreased, the bimetal strips 140 need only expand a small distance to move the valve member to the valve open postiion. Since the expansion of the strips 140 is related to the ambient temperature rise, it will be obvious that the valve will be moved to the valve open position when the temperature rise is relatively small. On the other hand, when the aforementioned distance is increased, the strips 140 will have to move through a greater distance to effect movement of the valve to the valve open position. Hence, the valve will open at a higher temperature than for the aforementioned case.

Figure 8:
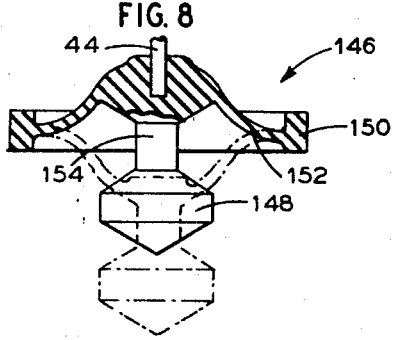
FIG. 8 is a vertical sectional view of a valve member constructed in accordance with the present invention which may be utilized in the valve body shown in FIG. 1.

FIG. 8 illustrates a valve member construction which will remain in either the valve open or the valve closed position without the necessity of maintaining the valve in one poston or the other by an external force. The valve member, which is designated generally by the reference numeral 146, is adapted to be used in a valve body such as the valve body 12 in FIGS. 1–3. For purposes of clarity, only the valve member 146 is shown in FIG. 8. However, it is to be understood that the plug end 148 of the valve member is adapted to seat on the orifice 30 when the valve member is in the lower position, and the plug is adapted to be spaced from the orifice when the valve member is in the upper position to open the valve.

The valve member 146 includes a circular peripheral wall 150 which is adapted to be received in the stem position 22 of the fluid chamber 24 in fluid tight engagement with the walls thereof. However, as distinguished from the diaphragm 32 of the valve member 26, the wall 150 is received in the fluid chamber 24 in spaced relation to the mouth of the stem portion 22.

A flexible and resilient web 152 connects the wall 150 with a central valve member section 154. The section 154 terminates in the plug end 148 which is adapted to seal the orifice 30. As shown in FIG. 8, the upper portion of the central section 154 is relatively thick as compared to the relatively thin web 152. Hence, the web 152 will flex to a greater degree than will the central section 154.

The web 152 functions as an over-the-center toggle which may reside in an upper position, as shown by the solid line drawing of FIG. 8, or a lower position, as shown by the dotted line position of FIG. 8. The upper and lower positions of the web 152 respectively correspond to the valve open and valve closed position of the valve member 146. That is, when the web 152 is in the lower dotted line position, the plug end 148 seals the orifice. On the other hand, when the web 152 is in the upper position, the plug end 148 is spaced from the orifice 30 to provide for the flow of a fluid therethrough.

As noted hereinabove, the web 152 is fabricated from a flexible and resilient material so that the web can move easily between its upper and lower positions. However, the web 152 is provided with a sufficient stiffness so that it will remain in either its upper or lower position without the necessity of applying an external force to maintain the web in that particular position. Thus, the valve member 146 will remain in either the valve open or the valve closed position until operated to the opposite position by the actuating member or stem 44 which is fixedly received in the central section 154. The stem 44 may be connected to a suitable control mechanism of the type described.

In operation, assuming that the valve member 146 is in the valve closed position, the web 152 and the central section 154 will be in their lower position as indicated by the dotted lines in FIG. 8. When it is desired to move the valve member 146 to the open position an upwardly directed force is applied to the stem 44. Thus, the central section 154 will move upwardly thereby causing the web 152 to flex upwardly. When the central section 154 has moved fully to the upper position, the stiffness of the web 152 will maintain the section in such a position, thereby eliminating the need for an external force to maintain the valve member in the valve open position.

When it is desired to close the valve, a downwardly directed force is applied to the central section 154 via the stem 44 to move the central section and the web 152 downwardly so that the plug end 148 seats on the orifice. Thus, the web 152 will flex downwardly so that it assumes a downwardly inwardly inclined position. The natural stiffness of the web 152 will maintain the central section 154 in this position so that the external actuating force may be removed without causing the plug end 148 to be unseated from the orifice.

Accordingly, a valve member has been provided which is movable between a valve open and a valve closed position to regulate the flow of a fluid through the valve wherein the valve may remain in either one of the positions or the other without the application of a biasing force.

Figure 9:
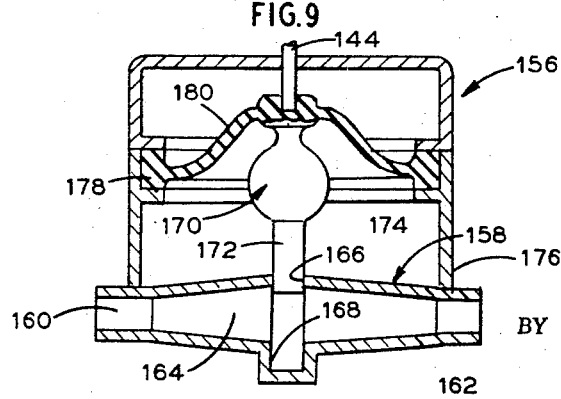
FIG. 9 is a vertical sectional view of a gating valve constructed according to the present invention.

FIG. 9 illustrates a gate valve which includes a valve member which may reside in either the valve open or the valve closed position without the need for an external force to maintain the valve member in either position. More specifically, the gate valve, which is designated generally by the reference numeral 156, includes a valve body 158 which is provided with a fluid inlet chamber 160 and a fluid outlet chamber 162. The inlet chamber 160 and the outlet chamber 162 communicate with each other through a communicating intermediate passage 164.

Provided in the top wall of the passage 164 is an aperture 166. Provided in the bottom wall of the passage 164 in alignment with the aperture 166 is a recess 168. Slidably received in the aperture 166 and adapted to be received in the recess 168 is a valve member designated generally by the reference numeral 170.

The valve member 170 includes a lower position 172 which is sized to extend transversely across and block the passage 164 to prevent the flow of fluid therethrough. More particularly, the portion 172 is slidable with respect to the aperture 166 and it is adapted to be received in fluid-tight engagement with the walls defining the recess 168 to block the passage of fluid. This position of the valve member 170 corresponds to the valve closed position. In the valve open position, the portion 172 is adapted to be moved upwardly to the position shown in FIG. 9 to unblock the passage 164 and permit fluid flow from the inlet chamber 160 to the outlet chamber 162.

Positioned above the portion 172 of the member 170 is an enlarged portion 174 which is adapted to engage the upper wall of the passage 164 to limit the downward travel of the member and to position the member in the valve closed position. Surrounding and encompassing the member 170 is a housing 176.

The valve member 170 includes a peripheral wall 178 which is in fluid tight engagement with the walls defining the housing 176. Connecting the peripheral wall 176 with the enlarged portion 170 is a resilient and flexible web 180. Similarly to the web 152 of the valve member 146, the web 180 has sufficient stiffness so that it will maintain the portion 172 in the valve closed position or the valve open position without requiring an external force to perform this function.

To be more specific, the web 180 has sufficient stiffness so that it may reside in a position in which it is inclined upwardly or a position in which it is inclined downwardly. These two positions correspond to the valve open and valve closed positions, respectively.

In operation, movement of the valve member 170 between the valve open and the valve closed positions is effected by an actuating member or stem 44 which is embedded in the valve member 170 and which extends beyond the top of the housing 176. The stem 44 may be connected to a suitable control mechanism (not shown) to selectively open and close the valve.

When a downwardly directed force is applied to the stem 44, the valve member 170 is moved to the valve closed position when the valve member 172 blocks the passage 164. Additionally, the web 180 will be oriented in a downwardly inwardly inclined position to maintain the valve member in the valve closed position. However, when an upwardly directed force is applied to the valve member 170 through the stem 44, the valve member 170 moves to the valve open position thereby permitting fluid to flow from the inlet chamber 160 to the outlet chamber 162 through the connecting passage 164. Moreover, the web 80 will assume an upwardly inwardly inclined position to maintain the valve member in the valve open position without the need for an external biasing force.

As noted hereinabove, the webs 152 and 180 in the respective embodiments of FIGS. 8 and 9 function as over-the-center toggle structures. More particularly, as the respective valve members pass beyond the center position of their respective webs (i.e., that position in which the webs lie in a horizontal plane) the webs flex and impart a force which is in a direction to aid the movement of the valve member. Hence, as the valve members pass the center position, a snap-action force is imparted to the valve member which accelerates its movement to either the valve open or the valve closed position.

While preferred embodiments of the invention have been shown and described herein, it will be obvious that numerous omissions, changes and additions may be made in such embodiment without departing from the spirit and scope of the present invention.

What is claimed is:

1. In combination, a valve including a valve body, a valve member, and a control therefor; said valve including an inlet chamber and an outlet chamber, a partition between said inlet and outlet chambers, an orifice in said partition communicating with said inlet and outlet chambers and providing a path therebetween, said valve member seating in said orifice and being adapted to be moved between a valve open position so that fluid can flow through said orifice and a valve closed position, and an actuating member connected to said valve member for moving said valve member between said valve open and valve closed positions; said control comprising a first bracket connected to said actuating member; temperature responsive means connected to said first bracket adapted to move said first bracket relative to said valve body to cause movement of said valve member to one out of said valve open and valve closed positions in response to an ambient temperature of a preselected value, said temperature responsive means including a piston cylinder having a piston therein movable between an extended and a retracted position, an expansible element within said piston cylinder for moving said piston from said retracted to said extended position in response to the rise in ambient temperature of said preselected value, a second bracket means adapted to engage said piston, whereby said first bracket is moved relative to said valve body to effect movement of said valve member to said valve open position when said piston is moved to said extended position, and heating means in heat exchanging relationship with said expansible element for selectively raising the ambient temperature to said preselected value, said heating means including a ceramic resistor surrounding a portion of said piston cylinder, and a ceramic material encapsulating said cylinder and said ceramic resistor to produce and store heat produced by said resistor.

2. The combination of claim 1, in which said expansible element expands at a rapid rate when said temperature rises above said preselected temperature and contracts at a rapid rate when the temperature falls below said preselected temperature.

References Cited

UNITED STATES PATENTS 2,181,900  12/1939  Langdon.

(Other references on following page)

| | | | |
|---|---|---|---|
| 2,285,913 | 6/1942 | Derrah | 251—11 X |
| 2,776,105 | 1/1957 | Schmitz | 251—335.1 X |
| 3,075,348 | 1/1963 | Baker | 60—23 |
| 3,107,894 | 10/1963 | Quinn | 251—335 X |
| 3,169,008 | 2/1965 | Whitlock | 251—11 |
| 3,266,235 | 8/1966 | Carlson | 251—11 X |
| 1,603,005 | 10/1926 | Flam | 251—75 |
| 2,521,891 | 9/1950 | Beams | 251—75 |

FOREIGN PATENTS 277,767   12/1951   Sweden.

ARNOLD ROSENTHAL, *Primary Examiner.*

U.S. Cl. X.R.

60—23; 236—68; 251—335, 75